United States Patent [19]

Yin et al.

[11] Patent Number: 5,690,978
[45] Date of Patent: Nov. 25, 1997

[54] HIGH VOLTAGE PULSED ELECTRIC FIELD TREATMENT CHAMBERS FOR THE PRESERVATION OF LIQUID FOOD PRODUCTS

[75] Inventors: Yongguang Yin, Changchun, China; Quinghua Howard Zhang, Columbus; Sudhir Kartikeya Sastry, Dublin, both of Ohio

[73] Assignee: Ohio State University, Columbus, Ohio

[21] Appl. No.: 723,419

[22] Filed: Sep. 30, 1996

[51] Int. Cl.⁶ .................. A23L 3/00; A23L 3/26; A23L 3/32
[52] U.S. Cl. .................. 426/237; 99/451; 99/483; 99/DIG. 14; 426/521
[58] Field of Search ............... 99/451, 483, DIG. 14, 99/516, 536, 358; 426/234, 237, 238, 521, 410, 241, 407, 247, 248; 422/22–24; 219/700, 735; 392/338, 497

[56] References Cited

U.S. PATENT DOCUMENTS

| | | | |
|---|---|---|---|
| 3,876,373 | 4/1975 | Glyptis | 422/22 X |
| 4,524,079 | 6/1985 | Hofmann | 426/234 |
| 4,695,472 | 9/1987 | Dunn et al. | 426/237 |
| 4,838,154 | 6/1989 | Dunn et al. | 99/451 |
| 5,048,404 | 9/1991 | Bushnell et al. | 99/451 |
| 5,235,905 | 8/1993 | Bushnell et al. | 99/451 |
| 5,250,160 | 10/1993 | Oksman et al. | 99/451 X |
| 5,282,940 | 2/1994 | Griffis et al. | 426/237 |
| 5,290,583 | 3/1994 | Reznik et al. | 426/521 X |
| 5,393,541 | 2/1995 | Bushnell et al. | 426/223 |
| 5,415,882 | 5/1995 | Knipper et al. | 426/237 |
| 5,447,733 | 9/1995 | Bushnell et al. | 426/237 |
| 5,514,391 | 5/1996 | Bushnell et al. | 426/237 |
| 5,527,105 | 6/1996 | Riach, Jr. | 426/237 |
| 5,534,278 | 7/1996 | DeRuyter et al. | 99/451 X |
| 5,549,041 | 8/1996 | Zhang et al. | 99/451 |
| 5,562,024 | 10/1996 | Polny, Jr. | 99/483 X |
| 5,603,972 | 2/1997 | McFarland | 422/22 |
| 5,607,710 | 3/1997 | DeRuyter et al. | 99/DIG. 14 |
| 5,630,360 | 5/1997 | Polny, Jr. | 99/358 X |

FOREIGN PATENT DOCUMENTS

| | | |
|---|---|---|
| 2 513 087 | 9/1981 | France . |
| 3-98565 | 4/1991 | Japan . |

OTHER PUBLICATIONS

"Engineering Aspects of Pulsed Electric Field Pasteurization," Zhang, Qinghua, et al., Journal of Food Engineering, 25:261–281, 1994.

"Inactivation of E. coli and S. cerevisiae by Pulsed Electric Fields Under Controlled Temperature Conditions," Zhang, Q., et al., 1994 American Society of Agricultural Engineers, vol. 37(2);581–587.

"Inactivation of Microorganisms in a Semisolid Model Food Using High Voltage Pulsed Electric Fields," Zhang, Qinghua, et al., Food Science & Technology (lwt), 1994, 2(6):538.

Primary Examiner—Timothy F. Simone
Attorney, Agent, or Firm—Calfee, Halter & Griswold LLP

[57] ABSTRACT

A pulsed electric field treatment device for the sterilization and preservation of pumpable food products having a at least two electrodes and an insulator and particularly suited for the inactivation of vegetative and bacterial spore microorganisms. Each electrode includes an electrode flow chamber for making electrical contact with the pumpable food product and for allowing the pumpable food product to flow through the treatment device. The insulator is situated between the electrodes and includes an insulator flow chamber positioned between the electrode flow chambers and provides for the flow of pumpable food product from one electrode flow chamber to the other. A high voltage pulse generator applies a high voltage signal of variable voltage, frequency and pulse duration to the electrodes. The electrode and insulator flow chambers may employ a variety of sectional and cross-sectional geometries including tubular, cylindrical, rectangular, elliptical and non-uniform design.

20 Claims, 9 Drawing Sheets

HIGH VOLTAGE PULSED ELECTRIC FIELD TREATMENT CHAMBERS FOR THE PRESERVATION OF LIQUID FOOD PRODUCTS

Federal sponsorship of this invention has been provided by Contract No. DAAK60-95-C-2064 awarded by the U.S. Army.

FIELD OF THE INVENTION

The present invention relates generally to food preservation systems and methods and, more specifically, to a pulse electric field treatment device for inactivating bacteria and microorganisms found in liquid food products.

BACKGROUND OF THE INVENTION

The preservation of food products is an important industrial and commercial activity and is primarily based on the inactivation, or destruction, of microorganisms in the food product. Existing methods of food preservation include the use of salts (i.e. sodium chloride), dehydration, heat pasteurization and freezing to inactivate microorganisms present in the food product. However, many of these processes affect the color, texture, flavor and taste of the foods preserved. For example, heat pasteurization can cause thermal damage to the food product and adversely affect its taste, flavor and nutrient content. As a result of this and other disadvantages, researchers have strived to develop nonthermal food sterilization techniques.

One such non-thermal food sterilization technique is known as Pulsed Electric Field (hereinafter PEF) treatment. Generally, in PEF treatment, an electric field voltage is applied across two electrodes where food material is between the electrodes. Because most liquid food products are primarily composed of water and nutrients such as proteins, vitamins, triglycerides and minerals, a corresponding electric field is induced in the food product and weakens the bacteria's cell structure. The bactericidal effect caused by PEF treatment is best explained by what is known as the Dielectric Rupture Theory.

According to the Dielectric Rupture Theory, PEF treatment reduces the activity of bacteria and other microorganisms by damaging the bacterial or microorganism cell structure. The applied electric field induces an electric potential across the membrane of a living cell. This electric potential, in turn causes an electrostatic charge separation in the cell membrane based on the polar nature of the cell membrane molecules. When this electric potential exceeds a critical value, pores form in weak areas of the cell membrane. When the critical value is exceeded by a large margin, the pore formation and cell membrane damage have a lethal effect on the bacteria or microorganism. However, the lethal effect of PEF treatment is dependent on many factors including, inter alia, the strength and length of time the electric field is applied, treatment temperature and the species of bacteria and/or microorganism to be inactivated. For further information on the engineering aspects of PEF treatment, see Zhang, Q., G. V. Barbosa-Cánovas and B. G. Swanson, *Engineering Aspects of Pulsed Electric Field Pasteurization*, Journal of Food Engineering, Vol. 25 pp. 261-281 (1994).

In particular, the lethal effect of PEF treatment on bacterial spores has heretofore been limited. The limited results are due in part to the bacterial spore's rigid structure and ability to resist unfavorable environmental conditions. Therefore, current PEF treatment methods and devices for the inactivation of bacterial spores have met with only limited success.

SUMMARY OF THE INVENTION

According to the present invention, a pulse electric field (PEF) treatment device is provided for preserving and sterilizing a liquid food product. The PEF treatment device includes a first and second electrode for supplying an electric field to the liquid food product. Each electrode includes an electrode flow chamber for accepting the flow of the liquid food product and for making electrical contact with the liquid food product. The PEF treatment device also includes at least one insulator positioned between the first and second electrodes and for electrically insulating the first and second electrodes from each other. The electrical insulator includes an insulator flow chamber for accepting the flow of liquid food product from the electrode flow chamber of the first electrode and the electrode flow chamber of the second electrode. The electrode flow chamber of the first electrode includes an inlet aperture and an outlet aperture. Similarly, the electrode flow chamber of the second electrode includes an inlet aperture and an outlet aperture. The insulator flow chamber also includes an inlet aperture and an outlet aperture. The insulator flow chamber and the electrode flow chambers are configured to comprise a single tubular flow chamber for accepting the flow of the liquid food product through the PEF treatment device. The insulator flow chamber inlet aperture and the first electrode flow chamber outlet aperture are positioned adjacent to each other and have substantially similar cross-sectional geometry. Similarly, the insulator flow chamber outlet aperture and the second electrode flow chamber inlet aperture are positioned adjacent to each other and have substantially similar cross-sectional geometry.

The present invention also provides a PEF treatment system for preserving and sterilizing a liquid food product. The system includes a high voltage pulse generator for supplying a pulsed electric field, a PEF liquid product treatment device for subjecting the liquid product to the pulsed electric field, a balance tank for storing the liquid food product to be treated, a de-oxygenator device for removing oxygen and other gases from the liquid food product, a pulseless pump for providing a continuous flow of liquid food product in the treatment system, at least one heat exchanger for regulating the temperature of the liquid food product, and an aseptic packaging device for packaging the liquid food product. The PEF liquid product treatment device is in circuit communication with the high voltage pulse generator and includes first and second electrodes for supplying an electric field to the liquid food product and an insulator for electrically insulating the plurality of electrodes from each other. Each electrode includes an electrode flow chamber for accepting the flow of the liquid product and for making electrical contact with the liquid product. The insulator includes an insulator flow chamber for accepting the flow of liquid food product and is positioned between the electrode flow chambers. The insulator flow chamber and the electrode flow chambers are configured so that a single tubular flow chamber for accepting the flow of liquid food product is formed thereby and each have inlet and outlet apertures of substantially similar cross-sectional geometry and adjacent to each other.

The present invention further provides a PEF treatment device having first and second electrodes for supplying an electric field to a liquid product, at least one insulator for electrically insulating the first and second electrodes from each other and an insertion member for providing electrical contact to the liquid product. Each electrode includes an electrode flow chamber for accepting the flow of liquid product and each insulator includes an insulator flow chamber for allowing the liquid product to flow from and to the electrode flow chambers. The electrode flow chambers and the insulation flow chamber are configured and positioned so as to form a single flow chamber for accepting the flow of the liquid product. The flow chambers each have inlet and outlet apertures of substantially similar apertures and are adjacent to each other. The insertion member is positioned within the electrode and insulator flow chambers and includes a plurality of conducting members and at least one insulator member. The plurality of conducting members provide electrical contact to the liquid product and the at least one insulator member provides electrical insulation between the plurality of conducting members. The insertion member includes a cylindrical body that is concentrically located within the single flow chamber that is comprised by the electrode and insulator flow chambers.

The present invention further provides a method of inducing a pulsed electric field in a liquid product for the inactivation of bacterial spores. The method includes the steps of pumping the liquid product through a treatment device so as to create a liquid product flow in the treatment device, generating a plurality of pulsed electric fields, and inducing the plurality of pulsed electric fields in the liquid product wherein the induced, pulsed electric field vector direction is parallel to the liquid product flow. Furthermore, the step of generating a plurality of pulsed electric fields includes the step of generating a pulsed electric field with a frequency range of 500 Hz to 20 kHz and an electric field range of 15 kV/cm to 160 kV/cm. The method further includes the step of regulating the liquid product temperature in the range of 31° to 36° C. Additionally, the step of generating a pulsed electric field includes a step of generating a pulsed electric field with a pulse length of 1 to 20 microseconds.

It is therefore an advantage of the present invention to provide a PEF treatment device that includes at least one tubular flow treatment chamber.

It is a further advantage of this invention to provide a PEF system for the preservation of liquid food products that includes a pulseless pump for providing a constant velocity of liquid product to ensure uniform treatment dosage.

It is further another advantage of this invention to provide a PEF system, device and method for the inactivation of bacterial spores in addition to vegetative microorganisms, thereby making the system, device and method suitable for the sterilization of food, nutriceutic, cosmetic and pharmaceutical products.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

PEF Treatment System Structure

Figure 1:
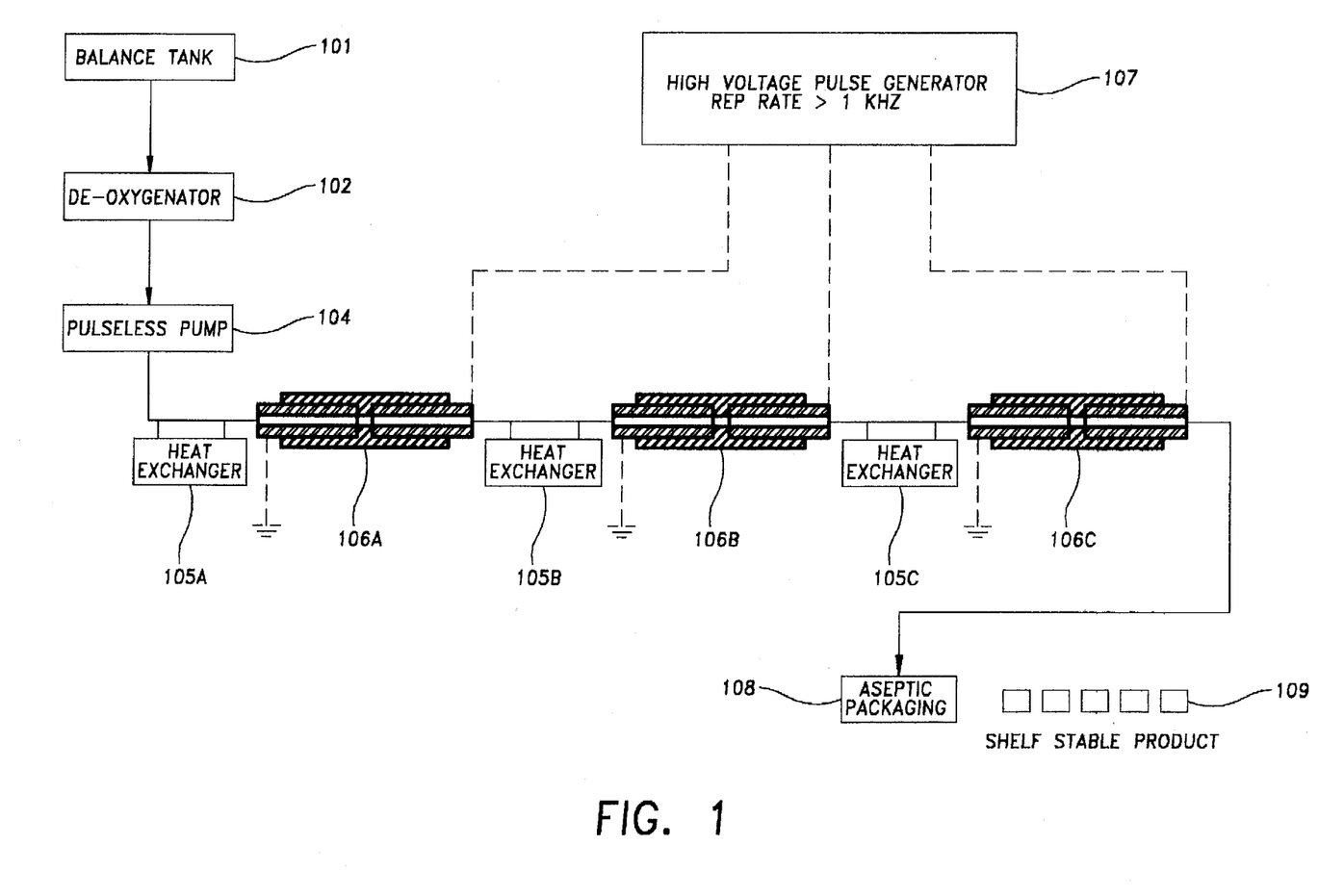
FIG. 1 is a schematic illustration of the PEF system of the present invention for extending the shelf life of perishable, pumpable liquid products utilizing a pulsed electric field (PEF) treatment device.

A pulsed electric field (PEF) treatment system is illustrated in FIG. 1. The system includes a balance tank 101, a de-oxygenator 102, a pulseless pump 104, heat exchangers 105A, B and C, PEF treatment devices 106A, B and C, a high voltage pulse generator 107 and an aseptic packaging device 108. The balance tank 101 holds the liquid product to be treated by the PEF system. The liquid product may be a wide range of products, including edible food products having a viscosity or extrusion capacity such that the food product may be forced into a flow through a treatment chamber. Other liquid products include extrudible products such as doughs or meat emulsions, fluid products such as beverages, fluid dairy products, gravies, sauces and soups, and food particulate containing food slurries such as stews, and food particulate containing soups, and cooked or uncooked vegetable or grain slurries. Moreover, the liquid food product may include nutriceutic, cosmetics and pharmaceutical products. The balance tank 101 is in physical communication with the de-oxygenator 102. The de-oxygenator 102 serves to remove dissolved gasses and/or product bubbles which might adversely affect the development of a substantially uniform electric field in the liquid product as it is treated in PEF treatment devices 106A, B and C.

The pulseless pump 104 is in physical communication with the de-oxygenator unit 102. The pulseless pump 104 provides the PEF treatment system with a flow of liquid product at a constant velocity to ensure uniform treatment. The pulseless pump 104 is further in physical communication with heat exchanger 105A and PEF treatment device 106A.

The heat exchangers 105A, B and C are in physical communication with PEF treatment devices 106A, B and C as shown in FIG. 1. While FIG. 1 illustrates the use of three heat exchangers interdigitized between three PEF treatment devices, different combinations involving more or less heat exchangers and PEF treatment devices are possible. For example, the PEF treatment system may include only one heat exchanger and one PEF treatment device. Generally, the number of heat exchangers and the number of PEF treatment devices will depend on the system design and treatment objectives. The heat exchangers 105A, B and C primarily serve as temperature regulators for the PEF treatment system. As shown in FIG. 1, the liquid product's temperature is first regulated by a heat exchanger before entering a PEF treatment device for sterilization or bacterial inactivation.

Still referring to FIG. 1, the high voltage pulse generator 107 is in circuit communication with each PEF treatment device. The high voltage pulse generator 107 provides PEF treatment devices with a high voltage wave form having variable voltage levels, frequency ranges and pulse duration times.

The last PEF treatment device (106C) is in physical communication with the aseptic packaging device 108. The aseptic packaging device 108 serves to aseptically pack and seal the liquid product in a sterile environment. One such commercially available aseptic packaging device is the Benco LaborPack/2 Aseptic Packaging Machine.

PEF Treatment Device Structure

Figure 2A:
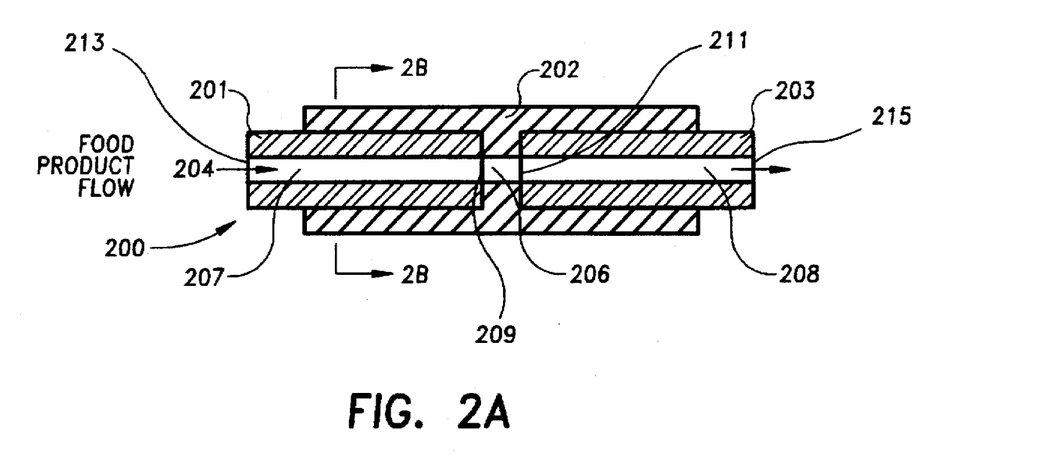
FIG. 2A is a cross-sectional side view of a first embodiment of a PEF treatment device having cylindrical electrodes and a cylindrical insulator.

Referring now to FIG. 2A, a cross-sectional side view of an embodiment of a pulsed electric field treatment device 200 is shown. The PEF treatment device 200 includes a first electrode 201 and a second electrode 203 and an insulator 202. First electrode 201 includes an electrode flow chamber 207 for making electrical contact with the liquid product and for allowing the liquid product to flow through the PEF treatment device 200. Similarly, electrode 203 includes an electrode flow chamber 208 for making electrical contact with the food product and for allowing the food product to flow out of the PEF treatment device 200. The electrode flow chambers 207 and 208 each include inlet and outlet apertures at 213 and 209, and at 211 and 215 respectively.

The insulator 202 is in physical communication with the first electrode 201 and the second electrode 203. The insulator 202 includes an insulator flow chamber 206 for allowing the flow of liquid product from the first electrode 201 to the second electrode 203. The insulator flow chamber 206 is in physical communication with the first electrode flow chamber 207 and the second electrode flow chamber 208 and includes an inlet and outlet aperture at 209 and 211 respectively. As shown in FIG. 2A, the first electrode 201, second electrode 203, insulator 202, first electrode flow chamber 207, insulator flow chamber 206, and second electrode flow chamber 208 are formed and configured such that the electrode flow chambers 207 and 208 and the insulator flow chamber 206 form a single tubular flow chamber through the PEF treatment device. The insulator flow chamber inlet aperture and the first electrode flow chamber outlet aperture are positioned adjacent to each other and have substantially similar cross- sectional geometry. Similarly, the insulator flow chamber outlet aperture and the second electrode flow chamber inlet aperture are positioned adjacent to each other and have substantially similar cross-sectional geometry. The phrase "substantially similar" is hereinafter used to express the concept that one may depart from the overall inlet and outlet aperture dimensions and shape and still maintain an overall degree so similarity in geometry and/or functionality. For example, inlet and outlet physical dimensions and shapes need not be identical, that is, the insulator flow chamber inlet or outlet apertures may be slightly larger or smaller than the electrode flow chamber outlet or inlet apertures, or vice-versa. Moreover, the electrode flow chamber inlet or outlet aperture may be elliptical while the insulator flow chamber outlet or inlet aperture may be circular, or vice-versa. Therefore, it should be apparent that an electrode flow chamber's inlet and/or outlet apertures and the insulator flow chamber's inlet and/or outlet apertures may have different dimensions and shapes and still maintain substantially similar cross-sectional geometries.

Figure 2B:
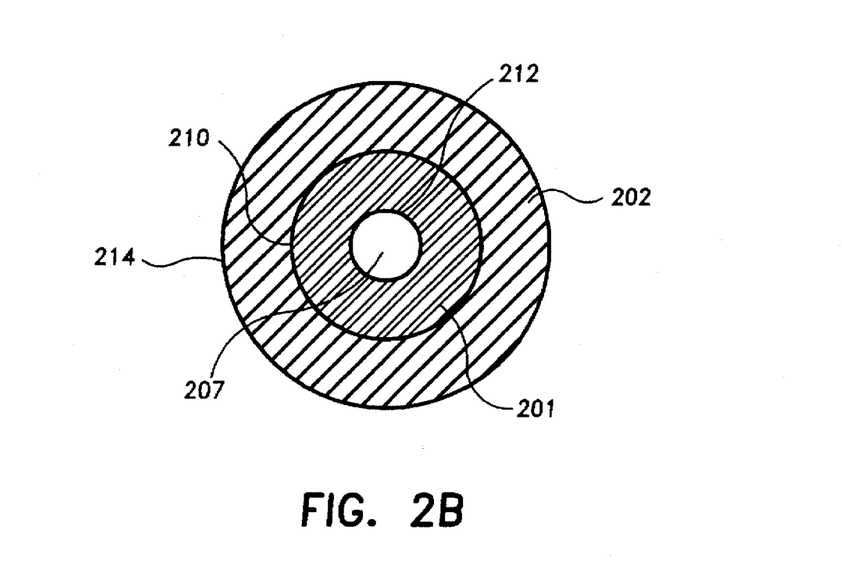
FIG. 2B is a sectional view taken along section line 2B—2B of FIG. 2A.

Referring now to FIG. 2B, a sectional view taken along a section line 2B—2B of FIG. 2A of PEF treatment device 200 is shown. The insulator 202 further includes an outer cylindrical insulator surface 214 and an inner cylindrical insulator surface at boundary 210. The electrode 201 includes an outer cylindrical electrode surface at boundary 210 that is in physical communication with the inner cylindrical insulator surface, also located at boundary 210. The electrode 201 further includes an inner cylindrical electrode surface 212 that forms the electrode flow chamber 207.

Figure 3A:
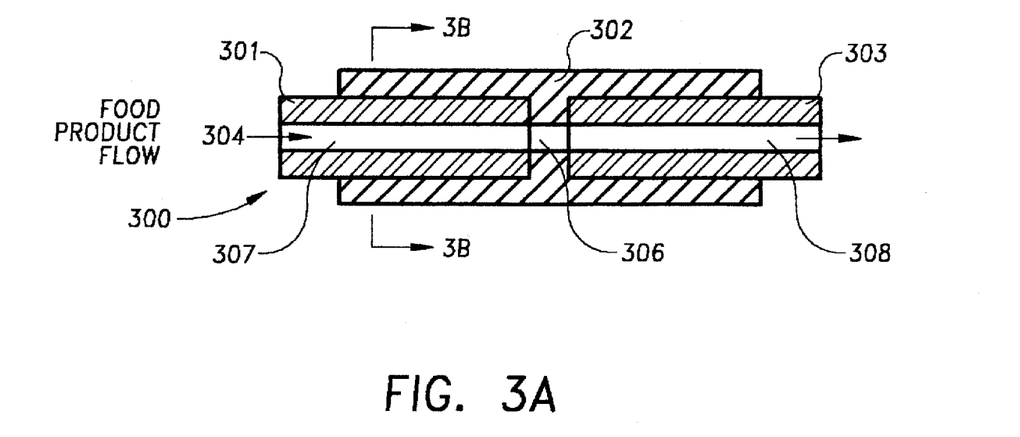
FIG. 3A is a cross-sectional side view of a second embodiment of a PEF treatment device having non-cylindrical electrodes and a non-cylindrical insulator.

Referring now to FIG. 3A, a cross-sectional side view of a second embodiment of a pulsed electric field treatment device 300 is shown. As evident from FIG. 2A, PEF treatment device 300 and PEF treatment device 200 have substantially similar cross-sectional side views. In particular, the PEF treatment device 300 includes a first electrode 301, a second electrode 303 and an insulator 302. First electrode 301 includes an electrode flow chamber 307 for making electrical contact with the liquid product and for allowing the liquid product to flow through the PEF treatment device 300. Similarly, the electrode 303 includes an electrode flow chamber 308 for making electrical contact with the food product and for allowing the food product to flow out of the PEF treatment device 300. The electrode flow chambers 307 and 308 each include inlet and outlet apertures.

The insulator 302 is in physical communication with the first electrode 301 and the second electrode 303. The insulator 302 includes an insulator flow chamber 306 for allowing the flow of liquid product from the first electrode 301 to the second electrode 303. The insulator flow chamber 306 is in physical communication with the first electrode flow chamber 307 and the second electrode flow chamber 308 and includes an inlet and an outlet aperture. As shown in FIG. 3A, the first electrode 301, second electrode 303, insulator 302, first electrode flow chamber 307, insulator flow chamber 306, and second electrode chamber 308 are formed and configured such that the electrode flow chambers 307 and 308 and the insulator flow chamber 306 form a single tubular flow chamber through the PEF treatment device 300. The insulator flow chamber inlet aperture and the first electrode flow chamber outlet aperture are positioned adjacent to each other and have substantially similar cross-sectional geometry. Similarly, the insulator flow chamber outlet aperture and the second electrode flow chamber inlet aperture are positioned adjacent to each other and have substantially similar cross-sectional geometry. In all embodiments hereinafter, the above insulator flow chamber inlet and outlet aperture configuration with electrode flow chamber inlet and outlet apertures shall be generally applicable.

Figure 3B:
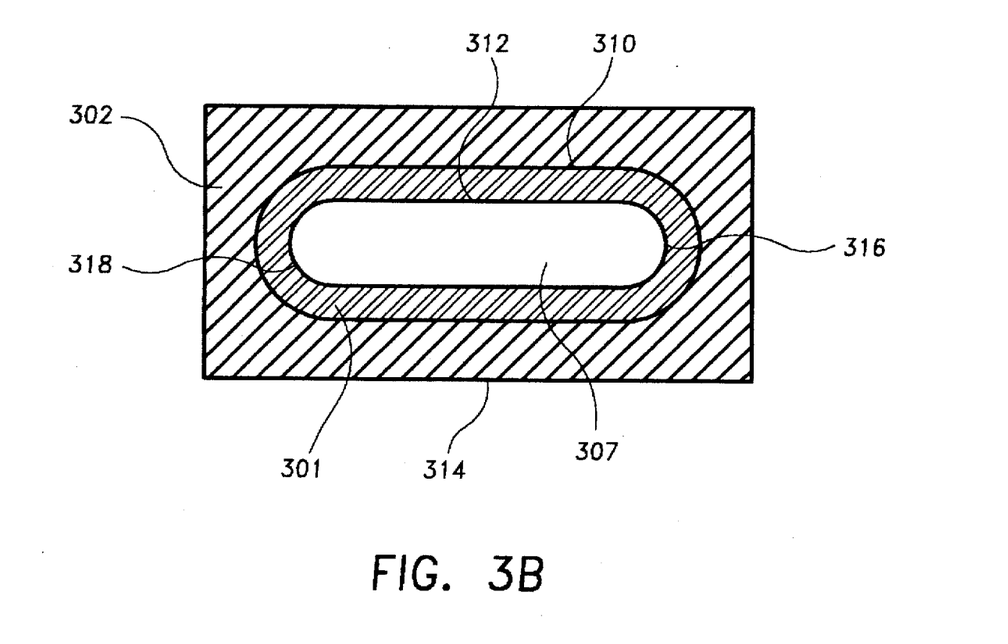
FIG. 3B is a sectional view taken along section line 3B—3B of FIG. 3A.

Referring now to FIG. 3B, a sectional view taken along a section line 3B—3B of FIG. 3A of PEF treatment device 300 is shown. The insulator 302 further includes an outer rectangular surface 314 and an inner rectangular surface having rounded ends at boundary 310. The first electrode 301 also includes an outer rectangular surface with rounded ends at boundary 310 and further is in physical communication with the inner rectangular insulator surface, also located at boundary 310. The first electrode 301 further includes an inner rectangular surface 312 with rounded ends 316 and 318. The inner rectangular surface 312 forms the electrode flow chamber 307. It should be noted that from FIGS. 2B and 3B, the sectional geometry of a PEF treatment device may take on various geometries based on design factors such as the nature of the liquid product (viscosity, particulate, electrical resistivity, etc.), liquid product flow rate, applied electric field strength, etc. Therefore, the PEF treatment device cross-sectional geometries may range from tubular or cylindrical cross-sections with tubular or cylindrical flow chambers, as shown in FIG. 2B, to rectangular cross-sections with rectangular flow chambers, as shown in FIG. 3B. Other possible cross-sectional geometries for the PEF treatment device and the flow chambers include uniform and non-uniform geometries and various elliptical geometries.

Figure 4:
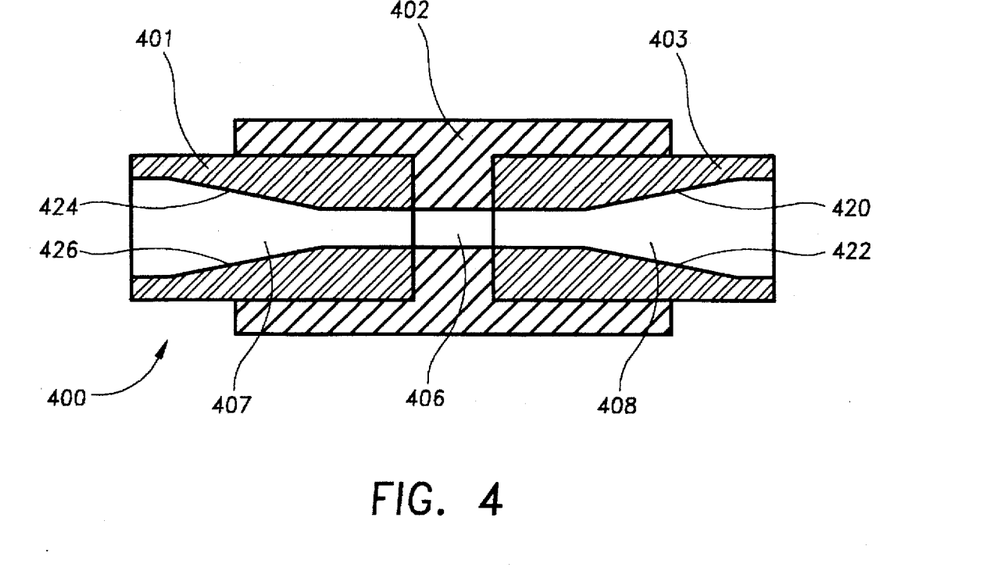
FIG. 4 is a cross-sectional side view of a third embodiment of a PEF treatment device having tapered electrode flow chambers.

Illustrated in FIG. 4 is a cross-sectional side view of a third embodiment of a pulsed electric field treatment device 400, having tapered electrode flow chambers 407 and 408. The PEF treatment device 400 includes a first electrode 401 and a second electrode 403, and an insulator 402. The first electrode 401 includes an electrode flow chamber 407 for making electrical contact with the liquid product and for allowing the liquid product to flow through the PEF treatment device 400. The electrode flow chamber 407 includes tapered surfaces 424 and 426 and inlet and outlet apertures. Similarly, electrode 403 includes an electrode flow chamber 408 for making electrical contact with the liquid product and for allowing the liquid to flow out of the PEF treatment device 400. Moreover, electrode flow chamber 408 includes tapered surfaces 420 and 422 and inlet and outlet apertures. The tapered surfaces 424 and 426 may be elements of various cross-sectional designs of the electrode flow chamber 407. Similarly, tapered surfaces 420 and 422 may be elements of various cross-sectional designs of electrode flow chamber 408. For example, electrode flow chambers 407 and 408 may include conical sectional geometries which include the tapered surfaces 424, 426, 420 and 422. Furthermore, the electrode flow chambers 407 and 408 may have rectangular or elliptical sectional geometries with decreasing areas that include tapered surfaces 424, 426, 420 and 422. Consequently, electrode flow chambers 407 and 408 can have any geometrically tapered sectional or cross-sectional geometry that is suitable for the system design specifications.

Figure 5:
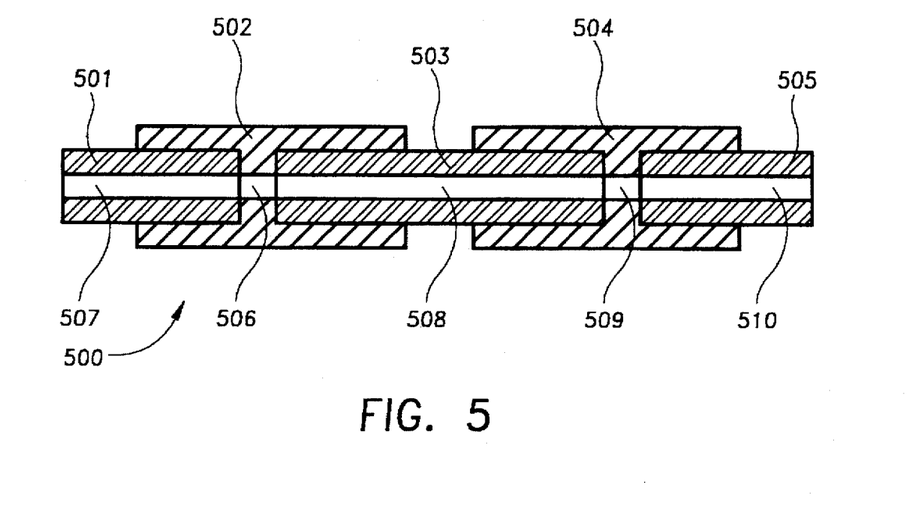
FIG. 5 is a cross-sectional side view of a fourth embodiment of a PEF treatment device having three electrodes and two insulators.

Illustrated in FIG. 5 is a cross-sectional side view of a fourth embodiment of a pulsed electric field treatment device 500, having three electrodes and two insulators. The PEF treatment device 500 includes a first electrode 501, a second electrode 503, a third electrode 505, a first insulator 502 and a second insulator 504. The first electrode 501 includes an electrode flow chamber 507 for making electrical contact with the liquid product and for allowing the liquid product to flow through the PEF treatment device 500. Similarly, second and third electrodes 503 and 505 include electrode flow chambers 508 and 510 for making electrical contact with the liquid product and for allowing the liquid product to flow through and out of the PEF treatment device 500. The first insulator 502 is in physical communication with the first electrode 501 and second electrode 503. The first insulator 502 includes an insulator flow chamber 506 for allowing the flow of liquid product from the first electrode 501 to the second electrode 503. Similarly, the second insulator 504 is in physical communication with the second electrode 503 and the third electrode 505. The second insulator 504 also includes an insulator flow chamber 509 for allowing the flow of liquid product from the second electrode 503 to the third electrode 505. The insulator flow chamber 506 is in physical communication with the first electrode flow chamber 507 and the second electrode flow chamber 508 and is positioned therebetween. Similarly, insulator flow chamber 509 is in physical communication with the second electrode flow chamber 508 and the third electrode flow chamber 510, and is positioned therebetween. As shown in FIG. 5, the electrode flow chambers 507, 508 and 510, and insulator flow chambers 506 and 509 are formed and configured such that the electrode flow chambers and the insulator flow chambers form a single flow chamber through the PEF treatment device 500.

Figure 6:
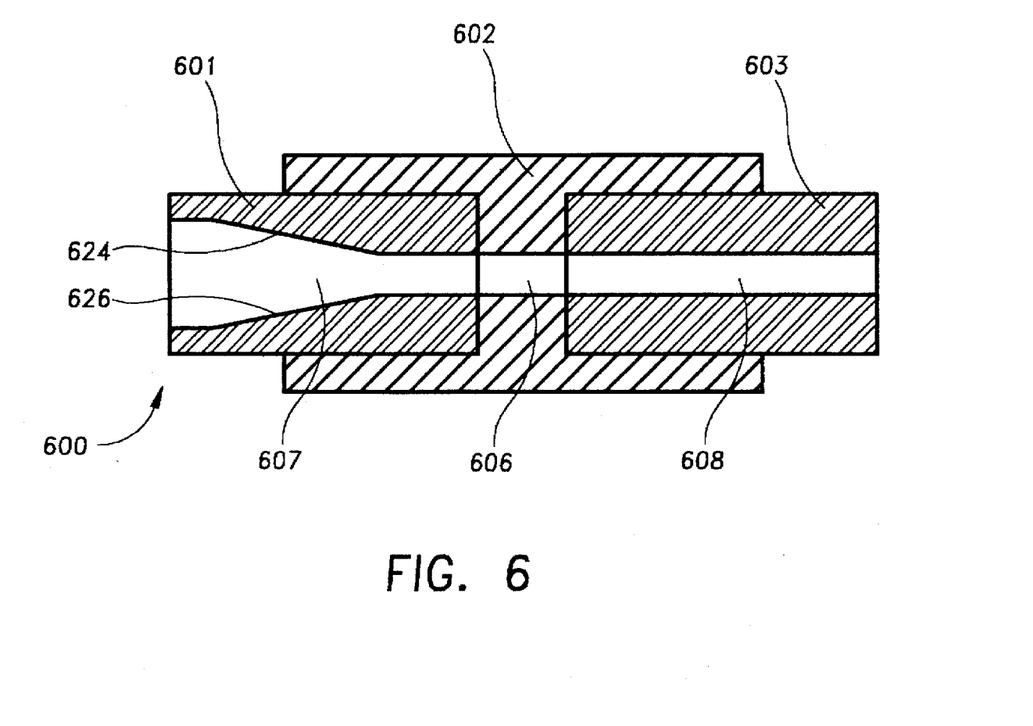
FIG. 6 is a cross-sectional side view of a fifth embodiment of a PEF treatment device having two electrodes of different cross-sectional geometry.

Illustrated in FIG. 6 is a cross-sectional side view of a fifth embodiment of a pulsed electrical field treatment device 600, having two electrodes of different cross-sectional geometries. The PEF treatment device 600 includes a first electrode 601 and a second electrode 603 and an insulator 602. The first electrode 601 includes a tapered electrode flow chamber 607 for making electrical contact with the liquid product and for allowing the liquid product to flow through the PEF treatment device 600. The tapered electrode flow chamber 607 includes tapered surfaces 624 and 626. As was described for electrode flow chamber 407 of FIG. 4, electrode flow chamber 607 can employ a variety of sectional and cross-sectional geometries based on the design specifications of the PEF treatment system.

The insulator 602 is in physical communication with the first electrode 601 and the second electrode 603. The insulator 602 includes an insulator flow chamber 606 for allowing the flow of liquid product from the first electrode 601 to the second electrode 603. The insulator flow chamber 606 is in physical communication with the first electrode flow chamber 607 and the second electrode flow chamber 608 and is positioned therebetween. As shown in FIG. 6, the electrode flow chambers 607 and 608 and the insulator flow chamber 606 are configured such that a single flow chamber is formed through the PEF treatment device 600.

Figure 7:
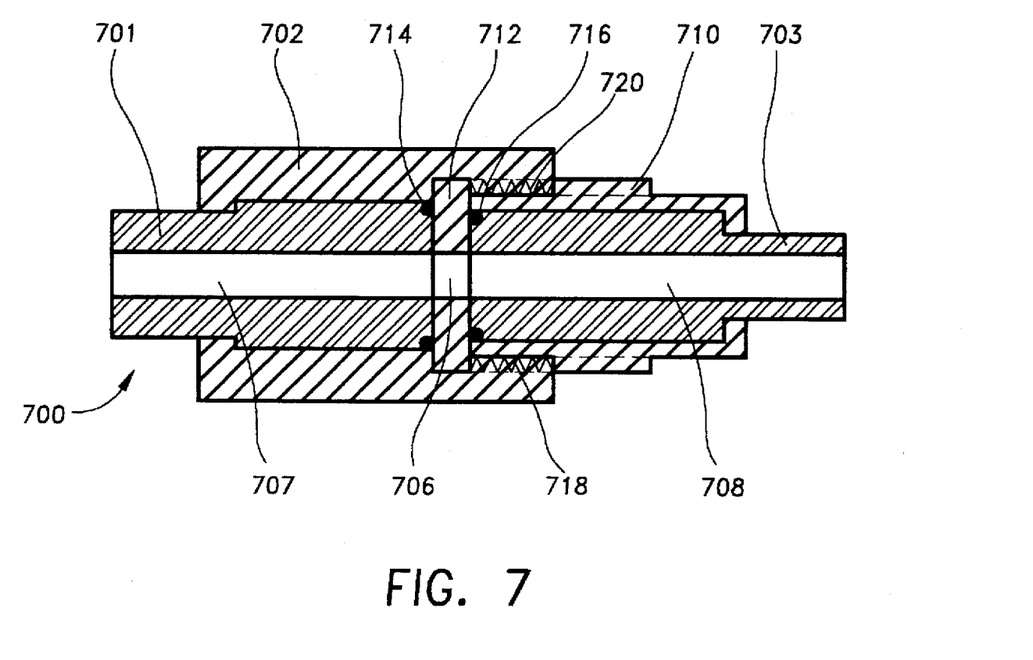
FIG. 7 is a cross-sectional side view of a sixth embodiment of a PEF treatment device.

Illustrated in FIG. 7 is a cross-sectional side view of a sixth embodiment of a pulsed electric field treatment device 700 having removable components. The PEF treatment device 700 includes a first and second electrode 701 and 703. The first electrode 701 includes an electrode flow chamber 707 for making electrical contact with the liquid product and for allowing the flow of liquid product into PEF treatment device 700. Similarly, the second electrode 703 includes an electrode flow chamber 708 for making electrical contact with the liquid product and from allowing the flow of liquid product to exit the PEF treatment device 700. The PEF treatment device 700 further includes a first insulator 702 and a second insulator 710. The first and second insulators 702 and 710 are in physical communication with each other and are connected via threading surfaces 718 and 720. The first insulator 702 includes inner threads, and the second insulator 710 includes outer threads such that the insulators 702 and 710 may be tightly threaded together.

Still referring to FIG. 7, the PEF treatment device 700 further includes an insulation cushion 712 and a first and second insulation washer 714 and 716. The insulation cushion 712 is in physical communication with the first and second electrodes 701 and 703, the first and second insulators 702 and 710, and the first and second insulation washers 714 and 716. Furthermore, insulation cushion 712 includes an insulator flow chamber 706 for allowing the flow of liquid product from the first electrode 701 to the second electrode 703. The configuration of the various components shown in FIG. 7 of PEF treatment device 700 are all concentric so that PEF treatment device 700 may be quickly assembled or disassembled via a twisting or turning motion due to the threaded interconnection of first insulator 702 and second insulator 710. This provides PEF treatment device 700 with the major advantages of low cost and easy maintenance. Additionally, PEF treatment device 700 has the advantage of allowing easy removal and replacement of the insulator cushion 712 and the insulator flow chamber 706.

Figure 8A:
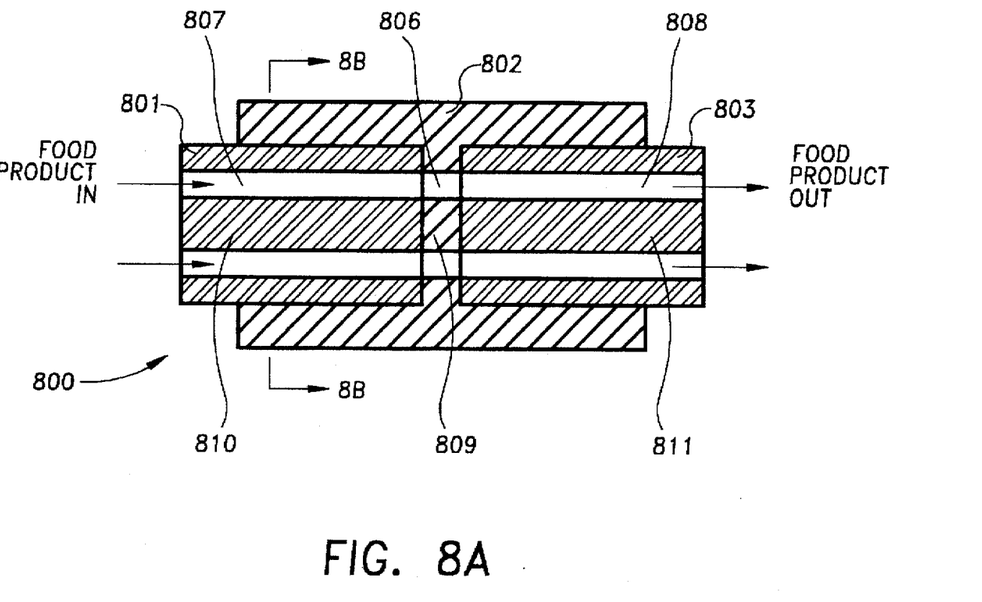
FIG. 8A is a cross-sectional side view of a seventh embodiment of a PEF treatment device having conducting and insulating members concentrically located within flow chambers.

Referring now to FIG. 8A, a cross-sectional side view of a seventh embodiment of a pulsed electric field treatment device 800 is shown. The PEF treatment device 800 includes a first electrode 801 and a second electrode 803 and a first insulator 802. First electrode 801 includes an electrode flow chamber 807 for making electrical contact with the liquid product and for allowing the liquid product to flow through the PEF treatment device 800. Similarly, electrode 803 includes an electrode flow chamber 808 for making electrical contact with the food product and for allowing the food product to flow out of the PEF treatment device 800. The first electrode 801 is in physical and/or circuit communication with a first conducting insert member 810 and the second electrode 803 is, similarly, in physical and/or circuit communication with a second conducting insert member 811. The first and second conducting members 810 and 811 are concentric with first and second electrodes 801 and 803 and are concentrically located within electrode flow chambers 807 and 808. Moreover, the first and second electrodes 801 and 803 may include an integrated construction that includes insert members 810 and 811 respectively. In the illustrated embodiment, the conducting insert members 810 and 811 have rod-like geometries.

The insulator 802 is in physical communication with the first electrode 801 and the second electrode 803. The insulator 802 includes an insulator flow chamber 806 for allowing the flow of liquid product from the first electrode 801 to the second electrode 803. The insulator flow chamber 806 is in physical communication with the first electrode flow chamber 807 and the second electrode flow chamber 808. An insulator insert member 809 is concentrically locted within insulator flow chamber 806 and is in physical communication with first and second conducting insert members 810 and 811. As shown in FIG. 8A, the first electrode flow chamber 807, insulator flow chamber 806, second electrode flow chamber 808, conducting insert members 810 and 811 and insulating insert member 809 are formed and configured such that the electrode flow chambers 807 and 808 and the insulator flow chamber 806 form a single tubular flow chamber through the PEF treatment device.

Figure 8B:
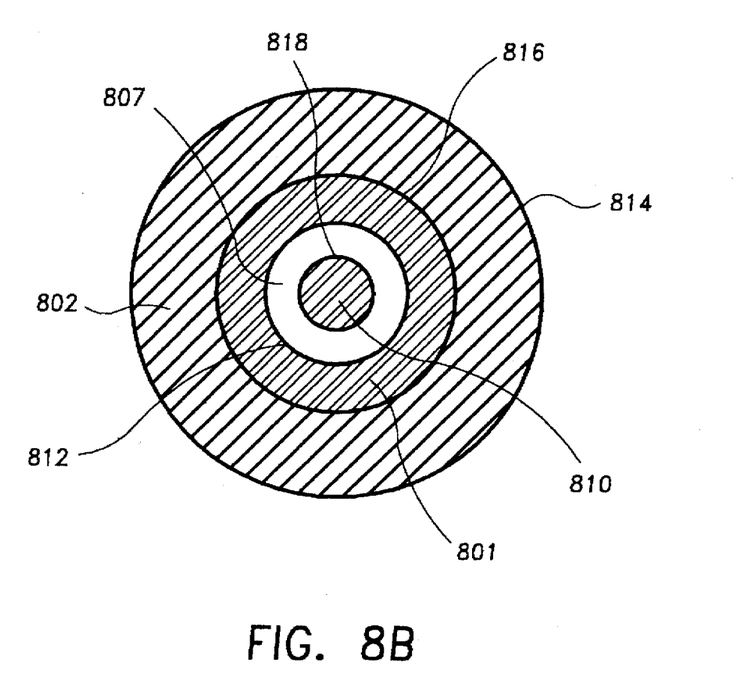
FIG. 8B is a sectional view taken along section line 8B—8B of FIG. 8A.

Referring now to FIG. 8B, a sectional view taken along a section line 8B—8B of FIG. 8A of PEF treatment device 800 is shown. The insulator 802 further includes an outer cylindrical insulator surface 814 and an inner cylindrical insulator surface at boundary 816. The electrode 801 includes an outer cylindrical electrode surface at boundary 816 that is in physical communication with the inner cylindrical insulator surface, also located at boundary 816. The electrode 801 further includes an inner cylindrical electrode surface 812 that forms the electrode flow chamber 807. The first conducting insert member 810 includes an outer cylindrical member 818 and is concentrically positioned within electrode flow chamber 807 to provide the flow chambers 807, 806, and 808 with improved liquid product flow characteristics (i.e. uniformity of liquid velocity), where such improved liquid flow characteristics are desirable.

In all of the illustrated embodiments, the electrodes comprise food-grade stainless steel. However, any other food-grade, electrically conducting material may be substituted in the above embodiments for the stainless steel. The various insulation components of the presently described embodiments are comprised of polycarbonate. However, the insulation components may be any electrically insulating material such as ceramics, glass or plastics.

Operation of The PEF Treatment Devices

To recall, the PEF treatment process applies an electric field voltage across two electrodes where a liquid product, such as a food product, exists between the electrodes. Because most liquid food products are primarily composed of water and nutrients, a corresponding electric field is induced in the food product. A bactericidal effect, commonly called the Dielectric Rupture Theory, arises due to this induced electric field in the liquid food product. According to the Dielectric Rupture Theory, PEF treatment reduces the activity of bacteria and other micro-organisms by damaging the bacterial or micro-organism cell structure. The applied electric field induces an electric potential across the membrane of a living cell, which, in turn, causes an electrostatic charge separation in the cell membrane and results in pore formation in weak areas of the cell membrane. The pore formation and cell membrane damage have a lethal effect on the bacteria or micro-organism. The operation of PEF treatment device 200 shown in FIGS. 2A and 2B will now be presently described in detail with respect to the inactivation of the *Bacillus subtilis* species of bacterial spore and with the understanding that the operational description is equally applicable to PEF treatment devices 300–800 shown in FIGS. 3A–8B.

Referring now to FIGS. 1, 2A and 2B, electrode 203 is in circuit communication with a high voltage terminal of the high voltage pulse generator 107 and electrode 201 is in circuit communication with a ground network. Therefore, when a high voltage pulse signal is applied across electrodes 203 and 201, an electric field is formed in electrode flow chambers 207 and 208, and insulator flow chamber 206. Furthermore, due to the physical configuration of electrodes 201 and 203 and insulator 202, the electric field strength will be strongest in insulator flow chamber 206, and will have a vector direction pointing from electrode 203 to electrode 201. Therefore, as liquid product passes through electrode flow chamber 207 to insulator flow chamber 206 and through electrode flow chamber 208, it is subjected to an applied electric field that is concentrated in insulator flow chamber 206. Accordingly, the liquid product in insulator flow chamber 206 is subjected to the concentrated applied electric field and because the liquid product is primarily composed of water and nutrients, the concentrated applied electric field will be present within the liquid product. Therefore, the bactericidal effect of the PEF treatment process of the present invention primarily occurs in the liquid product flowing through insulator flow chamber 206.

Figure 9:
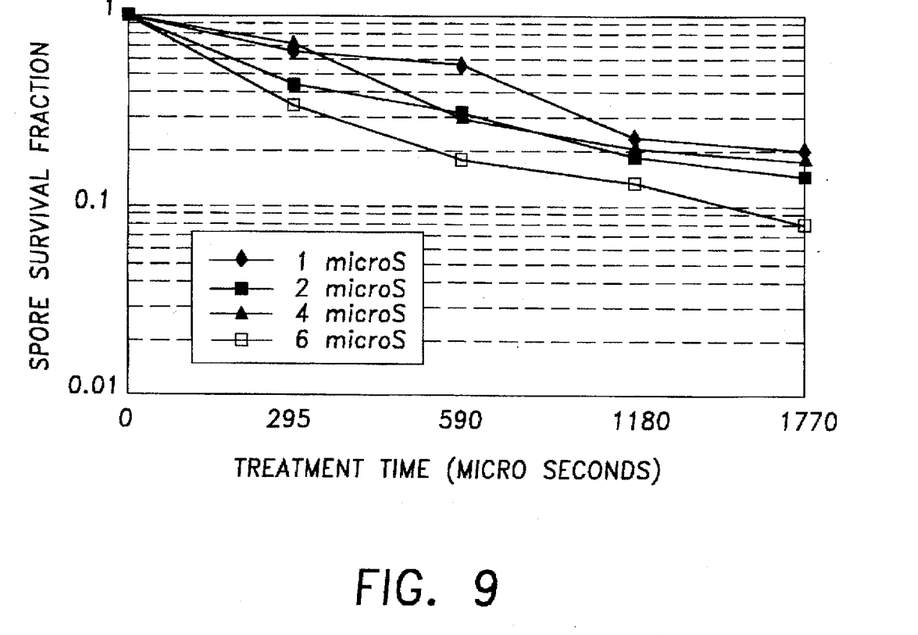
FIG. 9 is a graph illustrating the effect of pulse duration time on the inactivation of bacterial spores at the same energy input.

Illustrated in FIG. 9 is a graph showing the effect of pulse duration time on the inactivation of bacterial spores at a constant applied electric field. More particularly, FIG. 9 illustrates the inactivation of bacterial spores with pulse duration times of 1, 2, 4 and 6 microseconds and at frequencies of 3,000, 1,500, 750 and 500 Hz, respectively, and at an applied electric field strength of E=30 kV/cm and a temperature of T=36° C. FIG. 9 indicates that, with the same energy input, when the pulse duration time is increased from 1 to 6 microseconds, the inactivation of spores increases. As shown in FIG. 8, ninety-two percent (92%) of the spores were inactivated with 6 microsecond pulse durations applied for 1,770 microseconds (i.e., 295 pulses). In FIG. 8, the frequency was decreased in correspondence to the increased pulse duration times so that a constant power input was maintained for comparison purposes. As evident from FIG. 8, the frequency of the applied electric field signal is a factor that affects the inactivation rate of the bacterial spores.

Figure 10:
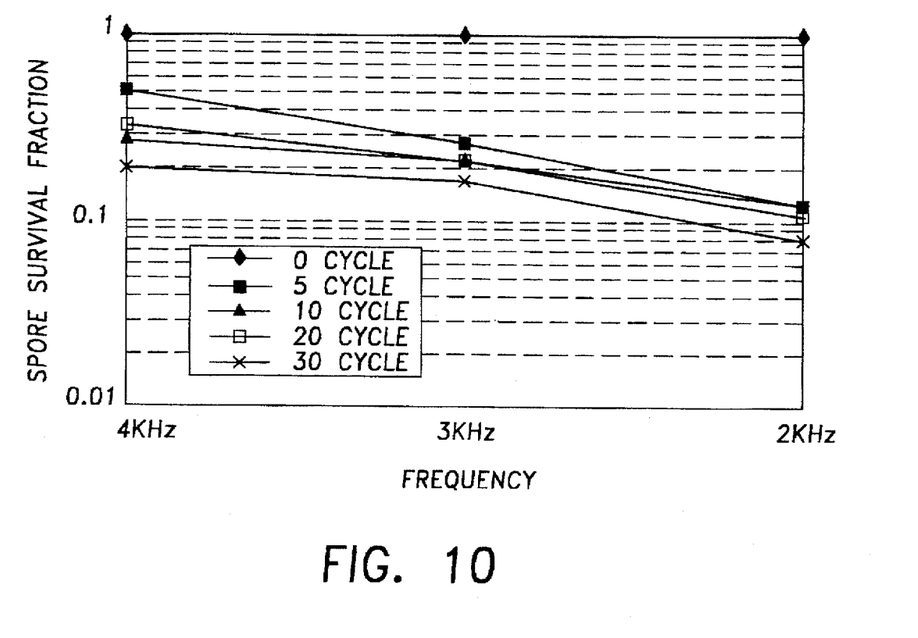
FIG. 10 is a graph illustrating the effect of bacterial spore inactivation as the pulsed electric field frequency is varied.

Illustrated in FIG. 10 is a graph showing the effect of bacterial spore inactivation as the pulsed electric field frequency is varied. More particularly, FIG. 10 illustrates the inactivation of bacterial spores at frequencies of 2,000, 3,000 and 4,000 Hz, with a pulse duration time of 3 microseconds and an applied electric field strength of E=30 kV/cm at a temperature of T=36° C. Therefore, as the frequency increases, the number of pulses and total treatment time that the bacterial spores receive also increases. However, as shown in FIG. 10, the inactivation rate of bacterial spores decreases as the frequency increases. Since bacterial spores are hard, but structurally fragile, FIG. 10 indicates that there is an optimal PEF treatment frequency that may cause resonance of the bacterial spore structure. This resonance causes a loosening of the rigid bacterial spore structure such that the applied pulsed electric field can, in effect, punch through the spore structure and inactivate the spores.

Figure 11:
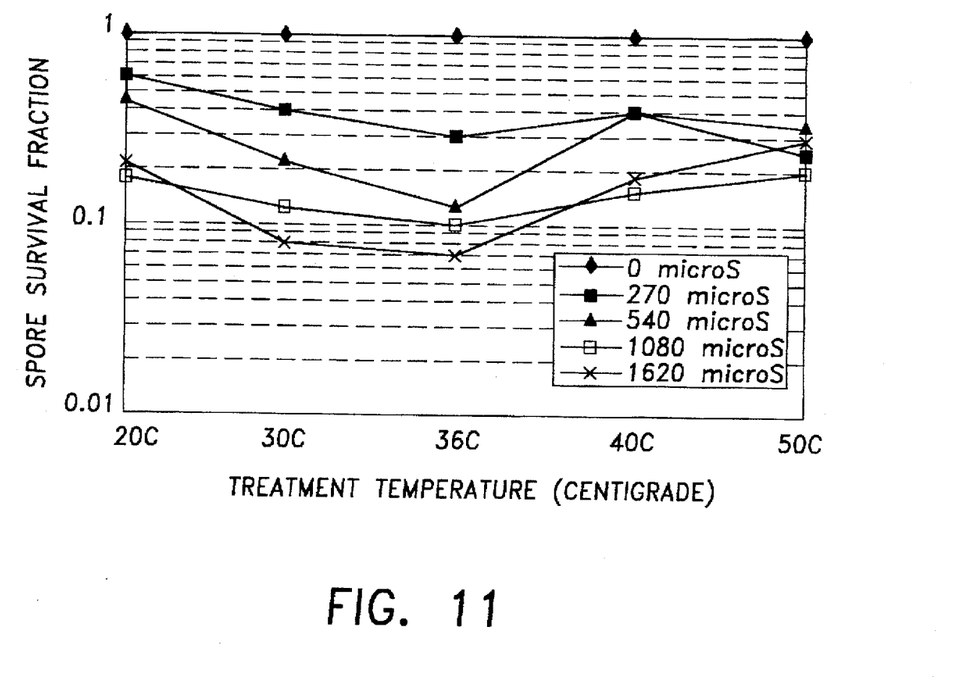
FIG. 11 is a graph illustrating the effect of temperature variation on bacterial spore inactivation.

Illustrated in FIG. 11 is a graph showing the effect of temperature variation on bacterial spore inactivation. Particularly, FIG. 11 illustrates the inactivation of bacterial spores at different treatment temperatures with an applied electric field strength of E=30 kV/cm at a frequency of f=1,500 Hz and a pulse duration time of $\tau$=2 microseconds. The inactivation of bacterial spores was tested at 20°, 30°, 36°, 40 and 50° C. The results shown in FIG. 11 illustrate that there is an optimum temperature of 36° C. for inactivating bacterial spores by PEF treatment. FIG. 11 also illustrates that the inactivation rate of bacterial spores increases with the total PEF treatment time at 30° and 36° C. treatment temperatures, while the inactivation rate does not exhibit significant change after 540 microseconds of total treatment time at 20°, 40° and 50° C. treatment temperatures. These results indicate that at the optimum treatment temperature, more bacterial spores tend to germinate and to be inactivated as the treatment time is extended.

Figure 12:
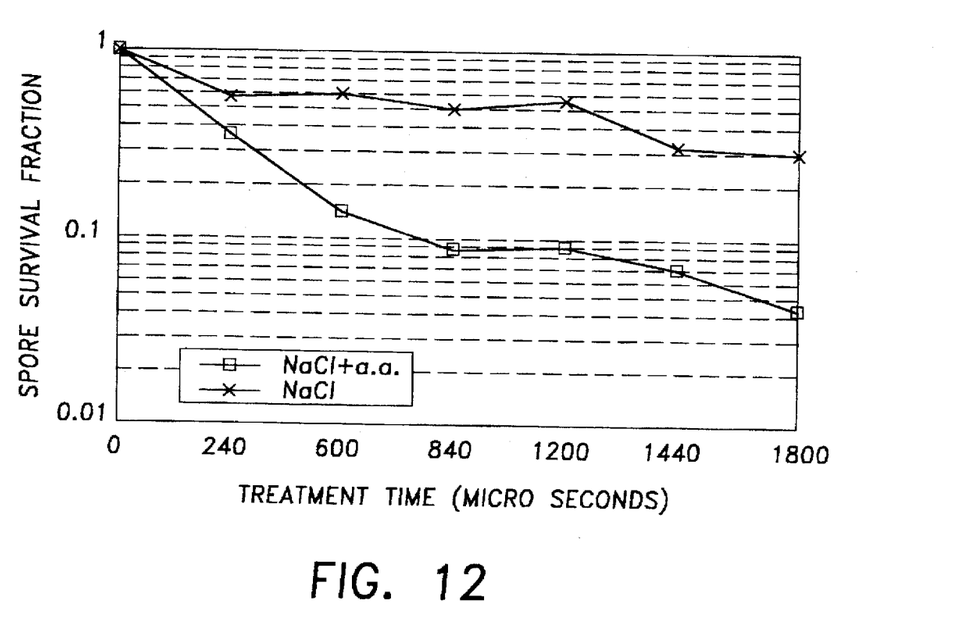
FIG. 12 is a graph illustrating the effect on bacterial spore inactivation in two treatment mediums as the treatment time is varied.

Referring now to FIG. 12, a graph illustrating the effect on bacterial spore inactivation in two treatment mediums as the treatment time is varied is shown. FIG. 12 shows the inactivation of bacterial spores in two treatment mediums: a 0.02% NaCl and a 0.02% NaCl+0.01% L-alanine. The PEF treatment parameters for FIG. 12 were an applied electric field strength of E=30 kV/cm, f=1,000 Hz, pulse duration time of $\tau$=6 microseconds and a treatment temperature of T=36° C., while two PEF treatment devices were used in series with an insulator flow chamber of 2 mm. L-alanine is considered as a germination agent for many strains of bacterial spores. As shown in FIG. 12, the inactivation rate of bacterial spores in the 0.02% NaCl treatment medium supplemented with the 0.01% L-alanine germination agent is higher than that of the 0.02% NaCl treatment medium without any germination agent. Also as shown in FIG. 12, for the first 120 microseconds of treatment time, there is very little difference between the inactivation rate of bacterial spores in the two treatment mediums. However, when the treatment time reaches 300 microseconds, the inactivation difference between the two mediums grows larger. These results indicate that more bacterial spores tend to germinate and be inactivated by PEF treatment as the treatment time is increased. Moreover, the results of FIG. 12 are consistent with the temperature results shown in FIG. 11.

Figure 13:
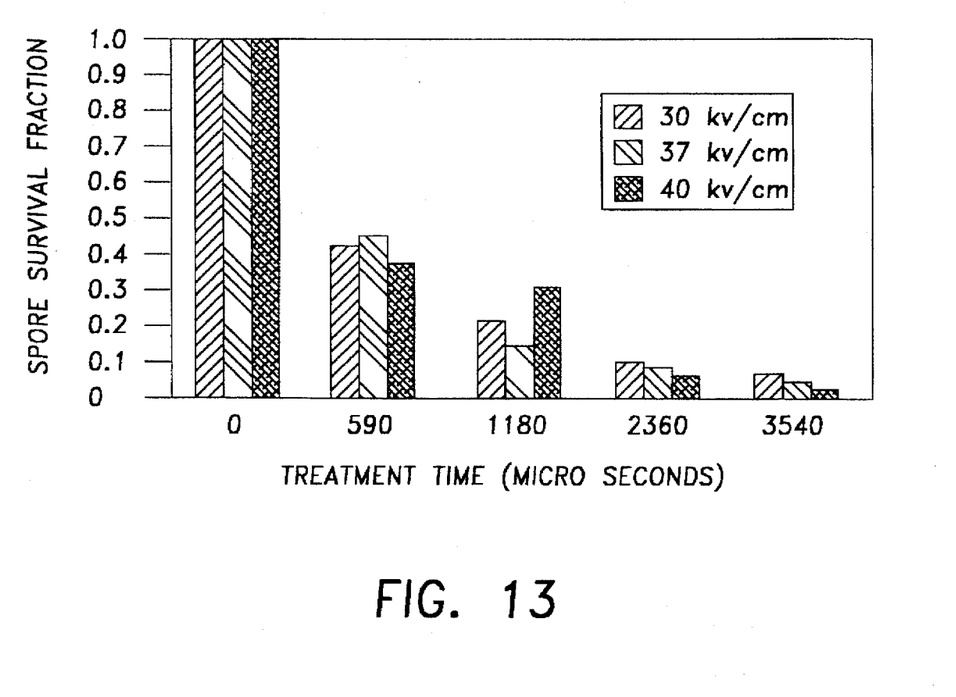
FIG. 13 is a bar graph illustrating the effect on bacterial spore inactivation at different electric field intensities as the treatment time is varied.

Illustrated in FIG. 13 is a bar graph showing the effect on the inactivation of bacterial spores at different applied electric field intensities as the treatment time is varied. More particularly, FIG. 13 shows the effect on bacterial spore inactivation at three electric field levels: 30, 37 and 40 kV/cm, while maintaining the applied electric field frequency at 2,000 Hz and the pulse duration time at $\tau$=3 microseconds and at a treatment temperature of T=36° C. FIG. 13 indicates that as the electric field intensity increases, the inactivation of bacterial spores increases. More particularly, after the bacterial spores were exposed to an electric field strength of 40 kV/cm for 3.5 milliseconds, 98% of the bacterial spores were inactivated. Therefore, the results shown in FIG. 13 indicate that in order to obtain a greater inactivation of bacterial spores, higher electric field strengths may be applied.

Accordingly, more than 95% of *Bacillus subtilis* bacterial spores were inactivated by the continuous flow PEF treatment system of the present invention with frequency ranges from 500 Hz to 4,000 Hz and a pulse duration time from 1 microseconds to 6 microseconds. Moreover, the optimum PEF treatment temperature for *Bacillus subtilis* bacterial spores is 36° C., and the presence of a germination agent, such as L-alanine, significantly enhances the PEF inactivation of the *Bacillus subtilis* bacterial spores. Furthermore, frequencies beyond 4000 Hz are possible. For example, frequencies from 4000 to 20,000 Hz may be employed depending on the system design parameters.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, the insulators, electrodes and liquid flow chambers may employ a variety of cross-sectional and sectional geometries, and the PEF treatment system operating parameters, such as applied electric field strength, treatment temperature and liquid product flow rates may be varied based on the nature of the liquid product to be treated, the micro-organism and/or bacterial to be inactivated. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A pulsed electric field treatment device for preserving a liquid product, comprising:
   (a) a first electrode for supplying an electric field to the liquid product and having an electrode flow chamber for accepting the liquid product and for making electrical contact with the liquid product; wherein the electrode flow chamber comprises an inlet aperture and an outlet aperture;
   (b) a second electrode for supplying an electric field to the liquid product and having an electrode flow chamber for accepting the liquid product and for making electrical contact with the liquid product; wherein the electrode flow chamber comprises an inlet aperture and an outlet aperture;

(c) at least one insulator positioned between the first and second electrodes for electrically insulating the first and second electrodes from each other; the insulator comprising an insulator flow chamber, for accepting liquid product from the electrode flow chamber of the first electrode, comprising an inlet aperture and an outlet aperture;
   (1) wherein the insulator flow chamber inlet aperture and the first electrode flow chamber outlet aperture are positioned adjacent to each other and have substantially similar cross-sectional geometry; and
   (2) wherein the insulator flow chamber outlet aperture and the second electrode flow chamber inlet aperture are positioned adjacent to each other and have substantially similar cross-sectional geometry; and
wherein the pulsed electric field treatment device permits a continuous flow of liquid product.

2. The device of claim 1 wherein the first and second electrodes each further comprise a body having:
   (a) a first surface in physical communication with the insulator;
   (b) a second surface spaced apart and inwardly from the first surface; and
wherein the second surface includes the electrode flow chamber.

3. The device of claim 2 wherein the first and second surfaces each comprise a cylindrical surface.

4. The device of claim 2 wherein the second surface further includes a tapered surface.

5. The device of claim 1 wherein the insulator further comprises:
   (a) a first surface in physical communication with the first and second electrodes;
   (b) a second surface spaced apart and inwardly from the first surface;
wherein the second surface includes the insulator flow chamber.

6. The device of claim 5 wherein the first and second surfaces each comprise a cylindrical surface.

7. The device of claim 1 further comprising a third electrode having a body comprising:
   (a) a first surface in physical communication with the at least one insulator;
   (b) a second surface spaced apart and inwardly from the first surface; and wherein the second surface includes an electrode flow chamber; and
wherein the insulator comprises a first insulator having a first insulator flow chamber and a second insulator having a second insulator flow chamber.

8. The device of claim 1 wherein the insulator further comprises:
   (a) a holder device for holding the first and second electrodes;
   (b) a cushion device for separating the first and second electrodes from each other and in physical communication with the first and second electrodes and the holder device;
   (c) a plurality of washer devices for allowing the replacement of the first and second electrodes, the insulator, the cushion device and the plurality of washer devices; the plurality of washer devices in physical communication with the first and second electrodes, the at least one insulator, the holder device and the cushion device.

9. The device of claim 1 wherein the first and second electrodes include stainless steel electrodes.

10. The device of claim 1 further comprising an insertion member for providing electrical contact to the liquid product and in circuit communication with the first and second electrodes and wherein the insertion member is positioned within the electrode flow chambers and the insulator flow chamber.

11. The device of claim 10 wherein the insertion member comprises:
   (a) a plurality of conducting members for making electrical contact with the liquid product; and
   (b) at least one insulator member for electrically insulating the plurality of conducting members from each other.

12. The device of claim 10 wherein the insertion member includes a cylindrical body concentrically located within the electrode flow chambers and the insulator flow chamber.

13. A pulsed electric field treatment system for preserving a liquid product, the system comprising:
   (a) a high voltage pulse generator for supplying a pulsed electric field to the system;
   (b) a liquid product treatment device in circuit communication with the pulse generator and for subjecting the liquid product to the pulsed electric field; wherein the liquid product treatment device comprises:
     (1) a first electrode for supplying an electric field to the liquid product and having an electrode flow chamber for accepting the liquid product and for making electrical contact with the liquid product; wherein the electrode flow chamber comprises an inlet aperture and an outlet aperture;
     (2) a second electrode for supplying an electric field to the liquid product and having an electrode flow chamber for accepting the liquid product and for making electrical contact with the liquid product; wherein the electrode flow chamber comprises an inlet aperture and an outlet aperture;
     (3) at least one insulator positioned between the first and second electrodes for electrically insulating the first and second electrodes from each other; the insulator comprising an insulator flow chamber, for accepting liquid product from the electrode flow chamber of the first electrode, comprising an inlet aperture and an outlet aperture;
       (i) wherein the insulator flow chamber inlet aperture and the first electrode flow chamber outlet aperture are positioned adjacent to each other and have substantially similar cross-sectional geometry; and
       (ii) wherein the insulator flow chamber outlet aperture and the second electrode flow chamber inlet aperture are positioned adjacent to each other and have substantially similar cross-sectional geometry; and
wherein the pulsed electric field treatment device permits a continuous flow of liquid product;
   (c) a balance tank for storing the liquid product to be treated;
   (d) a de-oxygenator device in physical communication with the balance tank and for removing oxygen from the liquid product;
   (e) a pulseless pump in physical communication with the de-oxygenator and for providing a continuous flow of liquid product in the treatment system;
   (f) at least one heat exchanger in physical communication with the liquid product treatment device and for regulating the temperature of the liquid product; and
   (g) an aseptic packaging device in physical communication with the liquid product treatment device and for packaging the liquid product.

14. The device of claim 13 further comprising a third electrode having a body comprising:
   (a) a first surface in physical communication with the at least one insulator;
   (b) a second surface spaced apart and inwardly from the first surface; and wherein the second surface includes an electrode flow chamber; and
wherein the insulator comprises a first insulator having a first insulator flow chamber and a second insulator having a second insulator flow chamber.

15. The device of claim 13 wherein the insulator further comprises:
   (a) a holder device for holding the first and second electrodes;
   (b) a cushion device for separating the first and second electrodes from each other and in physical communication with the first and second electrodes and the holder device;
   (c) a plurality of washer devices for allowing the replacement of the first and second electrodes, the insulator, the cushion device and the plurality of washer devices; the plurality of washer devices in physical communication with the first and second electrodes, the at least one insulator, the holder device and the cushion device.

16. The device of claim 13 wherein the insulator further comprises:
   (a) a first surface in physical communication with the first and second electrodes;
   (b) a second surface spaced apart and inwardly from the first surface;
wherein the second surface includes the insulator flow chamber.

17. A method of inducing a pulsed electric field in a liquid product for the inactivation of bacterial spores comprising the steps of:
   (a) continuously pumping the liquid product through a treatment device so as to create a continuous liquid product flow in the treatment device; the liquid product having a temperature;
   (b) generating a plurality of pulsed electric fields having a vector direction; wherein the step of generating a plurality of pulsed electric fields includes the step of generating a pulsed electric field with a frequency range of 500 Hz to 20 kHz and a field range of 15 kV/cm to 160 kV/cm; and (c) inducing the a plurality of pulsed electric fields in the liquid product wherein the induced, pulsed electric field vector direction is parallel to the continuous liquid product flow.

18. The method of claim 17 further including the step of regulating the liquid product temperature.

19. The method of claim 18 wherein the step of regulating the liquid product temperature includes the step of maintaining the liquid product temperature at 36 degrees Centigrade.

20. The method of claim 17 wherein the step of generating a pulsed electric field includes the step of generating a pulsed electric field with a pulse length of 1 to 20 microseconds.

* * * * *